(12) United States Patent
Hsueh

(10) Patent No.: US 6,366,784 B1
(45) Date of Patent: Apr. 2, 2002

(54) MOBILE PHONE EXTENSION SET

(76) Inventor: Chih-Yuan Hsueh, 5 FL., No. 4, Alley 30, Sublane 137, Lane 991, Ho-Ping RD., Pa-Teh City, Tauyuan Hsien (TW)

( * ) Notice: Subject to any disclaimer, the term of this patent is extended or adjusted under 35 U.S.C. 154(b) by 0 days.

(21) Appl. No.: 09/363,291

(22) Filed: Jul. 28, 1999

(51) Int. Cl.[7] .................................................. H04Q 7/20
(52) U.S. Cl. ........................ 455/462; 455/465; 455/414; 455/573; 379/428
(58) Field of Search ................................. 455/414, 462, 455/572, 573, 74.1, 554, 555, 465; 379/428, 446

(56) References Cited

U.S. PATENT DOCUMENTS

| | | | | |
|---|---|---|---|---|
| 4,752,949 A | * | 6/1988 | Steinbeck et al. | 379/61 |
| 5,526,403 A | * | 6/1996 | Tam | 379/59 |
| 5,600,709 A | * | 2/1997 | Hoflinger | 379/61 |
| 6,002,937 A | * | 12/1999 | Young et al. | 455/462 |
| 6,151,510 A | * | 11/2000 | Zicker | 455/553 |

* cited by examiner

Primary Examiner—Daniel Hunter
Assistant Examiner—Lana Le
(74) Attorney, Agent, or Firm—Pro-Techtor International Services

(57) ABSTRACT

A mobile phone extension set mainly includes a telephone set on which a signal bus and a charger are provided. The signal bus receives and transmits various function signals and is able to electrically connect a mobile phone via a signal line extended between the signal bus and the mobile phone. The charger is adapted to electrically connect and supply power to charge the mobile phone. Incoming and outgoing calls to and from the mobile phone could be received and made, respectively, on the extension telephone set instead of the mobile phone. More than one extension telephone set may be electrically connected to one another to give the mobile phone expanded extension ability for advantageously using at isolated areas where wire telephones could not be easily mounted.

5 Claims, 4 Drawing Sheets

MOBILE PHONE EXTENSION SET

FIELD OF THE INVENTION

The present invention relates to a mobile phone extension set, and more particularly to a mobile phone extension set to which a mobile phone is electrically connected to allow a user to receive incoming calls, make outgoing calls, and talk directly on the extension set instead of the mobile phone. The mobile phone extension set provided by the present invention is also provided with means for charging the mobile phone.

BACKGROUND OF THE INVENTION

A high quality voice communication through a mobile phone is available in recent years due to the highly developed communication technology, the governmental encouraging and open policy toward the radio-communication, the widely established signal transmission networks, and the matured satellite communication technology. The population of the mobile phone users in the world has largely grown by several hundred times compared to last a few years. Moreover, the mobile phone rate has largely reduced to enable even wider utilization of the mobile phone.

As a great contrast to the mobile phone that has become a popular means of voice communication for people in most areas, wire telephones used in isolated areas, such as places deep in the mountains, usually necessitate overhead wire works that are difficult, complicate, inconvenient, and extremely expensive to complete. Most people living or working in such isolated places can not afford the high cost of building the overhead wires and are frequently forced to give up the use of wire telephones. It is fortunately the mobile phone could now be used in such isolated places or some underdeveloped countries in which telephone cables are not available due to economical and/or technical factors. A disadvantage of the mobile phone is that it has not the extension function as regular wire telephone sets. The mobile phone usually includes only one single unit for use by one person at a time, and there is not any mobile phone extension set to allow the mobile phone to be used by more than one user at different places and times.

In view of the difficult overhead wire works of the wire telephones in isolated mountain areas, as well as the fact that no extension set is available for current mobile phone, it is tried by the inventor to develop a mobile phone extension set in an attempt to integrate the good communication function of the mobile phone with the convenient extension function of regular wire telephones, so that the mobile phone is suitable for areas that could not be conveniently contacted through wire telephones.

SUMMARY OF THE INVENTION

A primary object of the present invention is to provide a mobile phone extension set. The extension set mainly includes a regular telephone set that is particularly provided with a signal bus for receiving and transmitting various function signals. The mobile phone could be electrically connected to the signal bus of the extension set via a signal line. The extension set of the present invention is also provided with a charger for directly charging the mobile phone on the extension set. Therefore, any incoming and outgoing calls to and from the mobile phone may be answered and made, respectively, through the regular telephone of the extension set instead of the mobile phone. Moreover, more than one extension set may be electrically connected to the mobile phone depending on actual need to expand the extension function thereof.

Another object of the present invention is to provide a mobile phone extension set. The extension set is a regular telephone set having a slot for a mobile phone to position therein to electrically connect to the extension telephone set. The slot is provided with a number of contacts for correspondingly transmitting various function signals between the mobile phone and the extension telephone set.

BRIEF DESCRIPTION OF THE DRAWINGS

The above and other objects of the present invention, and the features and functions thereof can be best understood by referring to the following detailed description of the preferred embodiments and the accompanying drawings, wherein.

DETAILED DESCRIPTION OF THE PREFERRED EMBODIMENTS

Figure 1:
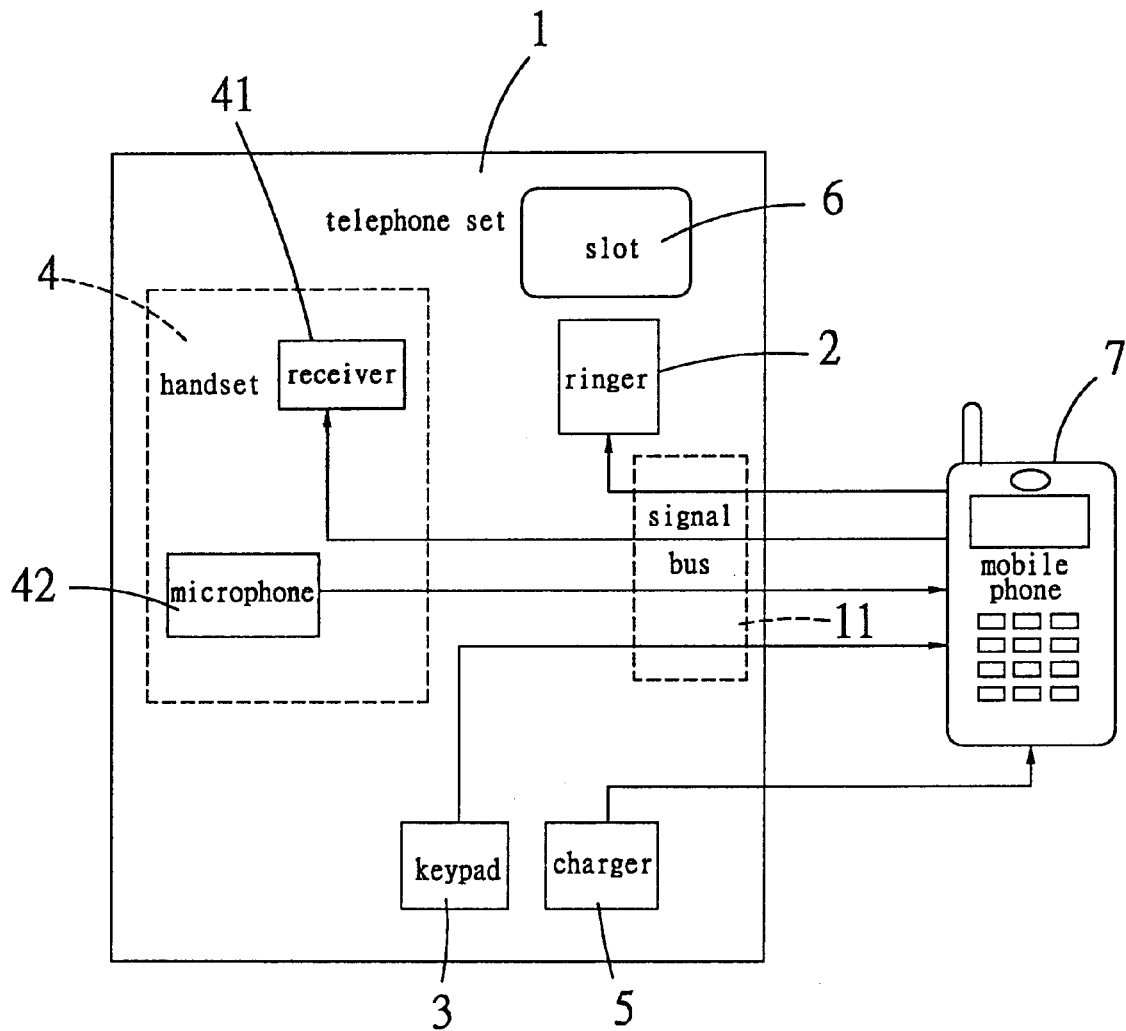
FIG. 1 is a block diagram of a mobile phone extension set according to a first embodiment of the present invention.
Figure 2:
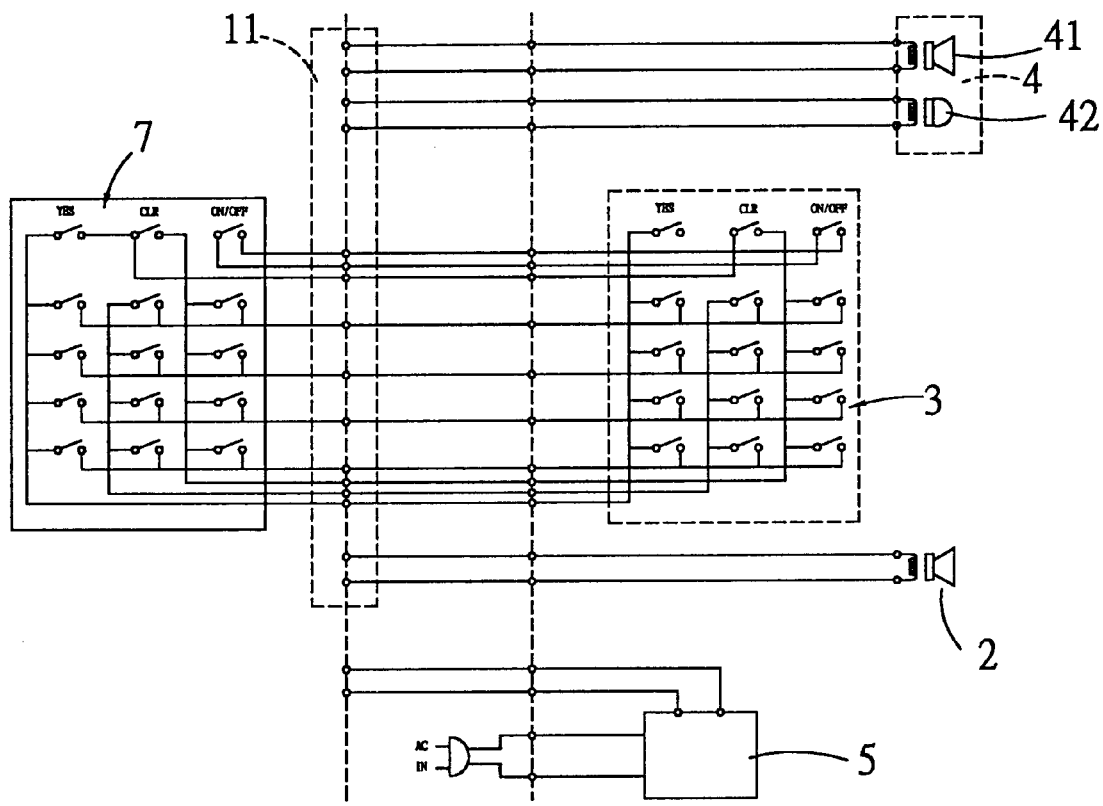
FIG. 2 is a circuit diagram of the mobile phone extension set of FIG. 1.

Please refer to FIGS. 1 and 2 that are block and circuit diagrams, respectively, of a mobile phone extension set according to a first embodiment of the present invention.

As shown in the diagrams, the mobile phone extension set of the present invention mainly includes a telephone set 1 on which a signal bus 11 is particularly provided. The signal bus 11 has a number of pins to separately correspond and electrically connect to a ringer 2, a keypad 3, and a receiver 41 and a microphone 42 of a handset 4 of the telephone set 1. The telephone set 1 is also provided with a mobile phone slot 6 into which a mobile phone 7 can be removably positioned. A signal line interconnects the mobile phone 7 positioned in the slot 6 to the signal bus 11. The telephone set 1 is further provided with a charger 5 that supplies a servo power to charge the mobile phone 7 via a conductor.

In the above-described mobile phone extension set, the mobile phone 7 and the telephone set 1 are designed to be two separable units. That is, the mobile phone 7 is an individual unit that could b e used independently. However, the telephone set 1 is functionally workable only when the mobile phone 7 is electrically connected to the signal bus 11 on the telephone set 1. The slot 6, in addition to be used for holding the mobile phone 7 therein, also has several contacts for separately electrically connecting to the ringer 2, the keypad 3, the receiver 41 an d the microphone 42 of the handset 4, and the charger 5. Whereby, when the mobile phone 7 is correctly positioned in the slot 6, various function signals could be transmitted from the mobile phone 7 to the telephone set 1, making the telephone set 1 functionally workable.

When the mobile phone 7 positioned in the slot 6 is induced by an incoming call signal, the received signal is decoded into a data signal source that triggers a ringing signal. The ringing signal is transmitted via the signal bus 11 to actuate the ringer 2 for the ringer 2 to ring. The received signal source is transmitted via the signal bus 11 to the keypad 3 and waits for a confirmation of the signal. Once correct keys on the keypad 3 are duly depressed to confirm reception of the received signal source, another signal is fed back to the mobile phone 7 to indicate the incoming call has been connected. Meanwhile, the ringer 2 is disconnected and the receiver 41 and the microphone 42 of the handset 4 are enabled. At this point, a phonic signal source of the incoming call is converted into an alternating voice source through a digital to analog conversion. The alternating voice source is transmitted via the signal bus 11 to the receiver 41 of the handset 4. On the other hand, a voice to be transmitted passes the microphone 42 of the handset 4 and is converted from a voice source into a phonic source signal that is transmitted via the signal bus 11 to the mobile phone 7. In the mobile phone 7, the phonic source signal to be transmitted is converted into frequency waves through an analog to digital conversion and is then transmitted via an antenna on the mobile phone 7.

And, to make an outgoing call, first pick up the handset 4 and dial a desired phone number and confirm the transmission of the call by depressing suitable keys on the keypad 3. At this point, the phone number input via the keypad 3 is encoded to provide a digital signal that is transmitted via the signal bus 11 to the mobile phone 7. The digital signal is converted into frequency waves in the mobile phone 7 and is transmitted via the antenna of the mobile phone 7. And, at the same time the transmission of the input phone number is confirmed, the receiver 41 and the microphone 42 of the handset 4 are enabled for users to talk over the telephone set 1.

Figure 3:
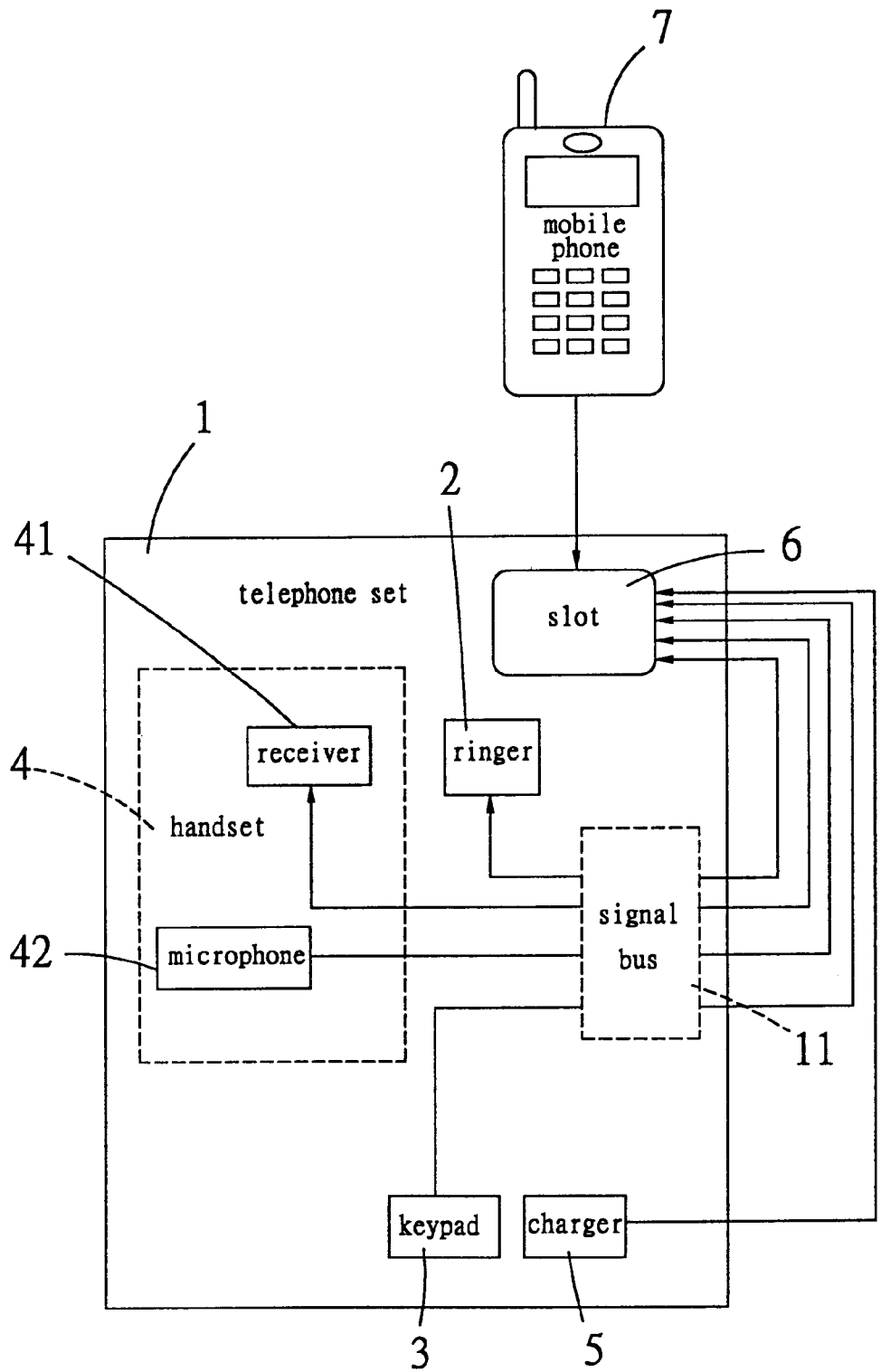
FIG. 3 is a block diagram of a mobile phone extension set according to a second embodiment of the present invention.

It is to be noted the connection of the signal bus 11 to the mobile phone 7 via a signal line is not the only way to enable the telephone set 1. As shown in FIG. 3, it is also possible to have various function signals for the telephone set 1 all directly sent to a number of contacts provided in the slot 6 corresponding to, for example, the ringer 2, the keypad 3, and the receiver 41 and the microphone 42 of the handset 4, so that signals may be directly transmitted from and received by the telephone set 1 when the mobile phone 7 is positioned in the slot 6.

Figure 4:
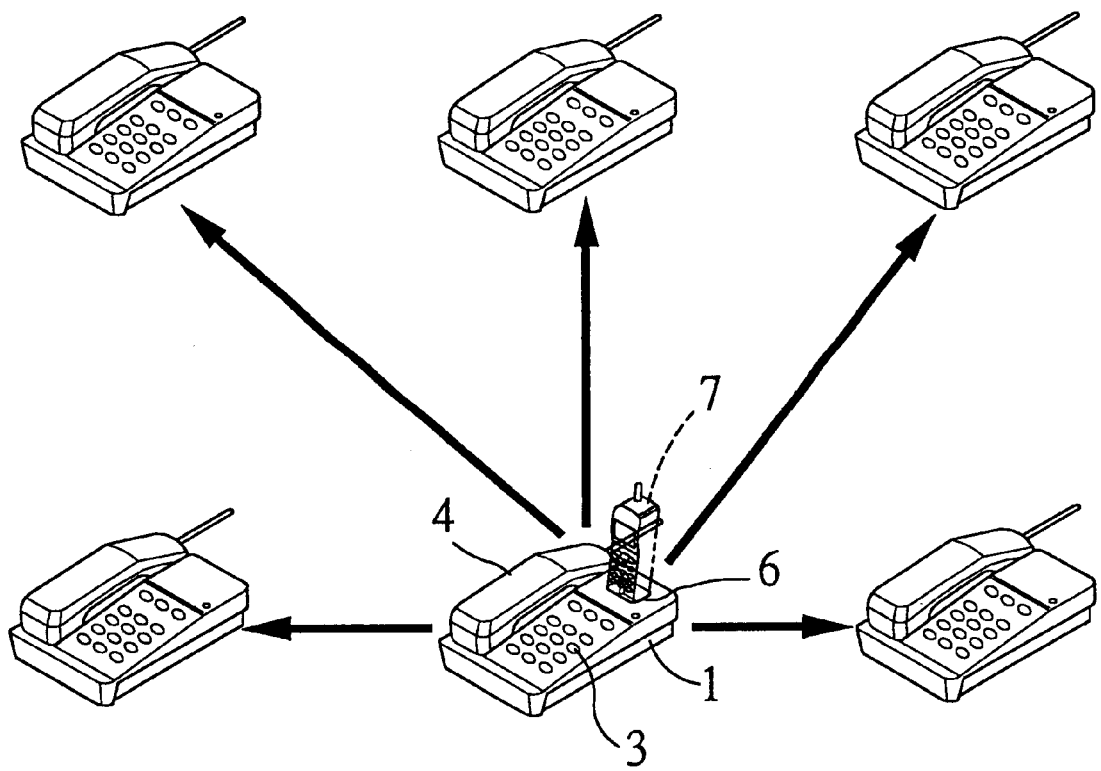
FIG. 4 schematically illustrates an example of the utilization of the present invention.

With the above arrangements, when the mobile phone 7 is electrically connected to the extension set, that is, the telephone set 1, the telephone set 1 could be directly used to receive any incoming call, to make any outgoing call, and to connect to any number of extension telephone sets depending on actual need, as shown in FIG. 4. That is, the telephone set 1 with the mobile phone 7 positioned in the slot 6 not only could be used as a regular telephone set but also could have any number of extension telephone sets connected to it. In the case only one single telephone set 1 according to the extension set of the present invention is provided with multiple regular extension telephone sets connected thereto, a use mode of one single mobile phone/multiple phone lines is available. And, in the case multiple telephone sets 1 according to the present invention are provided with or without regular telephone sets connected thereto, multiple mobile phones 7 may be separately positioned in the slots 6 of these telephone sets 1 to allow a use mode of multiple phones/multiple phone lines.

As described above, the present invention integrates the communication functions of a mobile phone with the extension function of regular wire telephone. For an isolated place or any underdeveloped country where regular wire telephones could not be conveniently mounted, the present invention is well suited for use to replace the wire telephones.

What is to be noted is the form of the present invention shown and disclosed is to be taken as a preferred embodiment of the invention. Various changes in the shape, size, and arrangements of parts may be resorted to without departing from the spirit of the invention or the scope of the subjoined claims.

What is claimed is:

1. A cellular phone extension set comprising:

at least one extension telephone, said extension telephone comprises at least a signal bus and a charger;

said signal bus includes multiple pins to form independent electrical circuits connecting said signal bus to a ringer, a keypad, and a receiver and a microphone of a handset on said extension telephone so that said signal bus receives and transmits function signals and electrically connects said cellular phone via a signal line extended between said signal bus and said cellular phone; and said charger supplies power to charge said cellular phone; such that incoming and outgoing calls to and from said cellular phone are received and made on either said extension telephone or said cellular phone.

2. The cellular phone extension set as claimed in claim 1, wherein:

said set comprises a plurality of said extension telephones, each of said extension telephones being electrically connected to all of the remaining said extension telephones.

3. The cellular phone extension set as claimed in claim 1, wherein:

said extension telephone is provided with a slot to receive said cellular phone, said slot having electrical connection means so that said cellular phone is electrically connected to said extension telephone.

4. A cellular phone extension set comprising:

at least one extension telephone, said extension telephone comprises at least a signal bus, a charger, and a slot; wherein said slot receives said cellular phone, said slot having electrical connection means so that said cellular phone is electrically connected to said extension telephone;

said signal bus includes multiple pins to form independent electrical circuits connecting said signal bus to a ringer, a keypad, and a receiver and a microphone of a handset on said extension telephone so that said signal bus receives and transmits function signals and electrically connects said cellular phone via a signal line extended between said signal bus and said cellular phone; and said charger supplies power to charge said cellular phone; such that incoming and outgoing calls to and from said cellular phone are received and made on either said extension telephone or said cellular phone.

5. The cellular phone extension set as claimed in claim 4, wherein:

said set comprises a plurality of said extension telephones, each of said extension telephones being electrically connected to all of the remaining said extension telephones.

* * * * *